Dec. 24, 1963     O. G. WALRABENSTEIN     3,115,024
APPARATUS AND METHODS FOR MAKING STOCKINGS AND THE LIKE
Filed Sept. 16, 1958     7 Sheets-Sheet 5
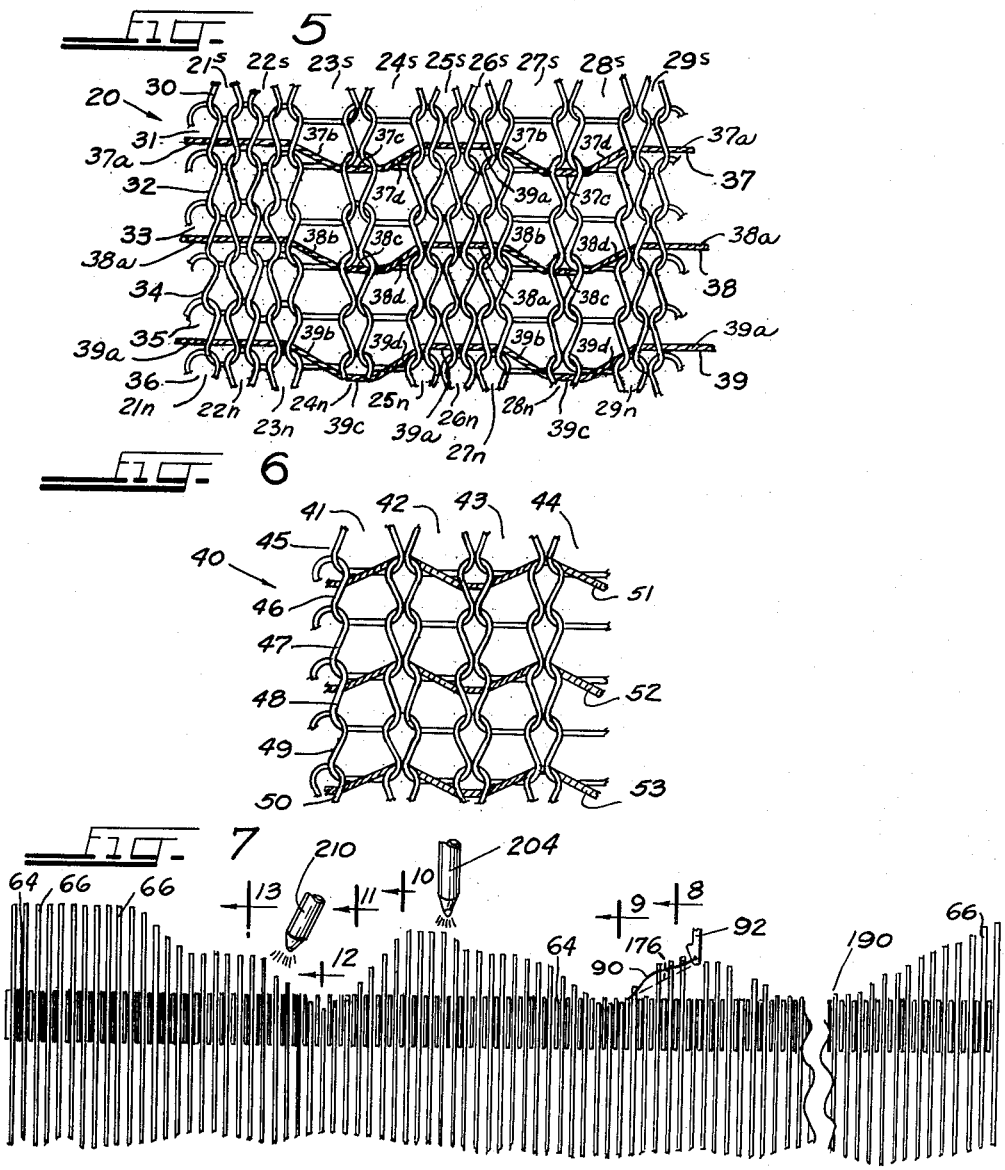
INVENTOR.
Oscar G. Walrabenstein Dec. 24, 1963　　　O. G. WALRABENSTEIN　　　3,115,024
APPARATUS AND METHODS FOR MAKING STOCKINGS AND THE LIKE
Filed Sept. 16, 1958　　　　　　　　　　　7 Sheets-Sheet 6
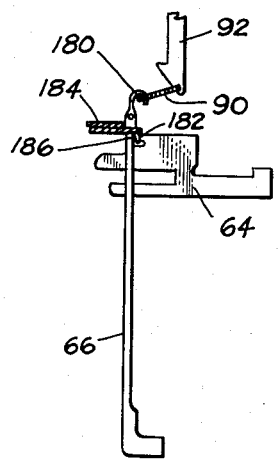
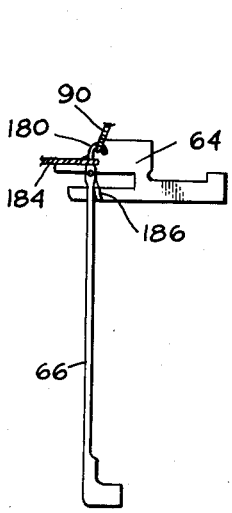
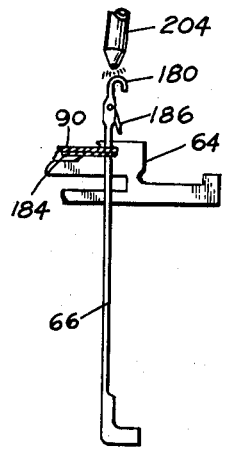
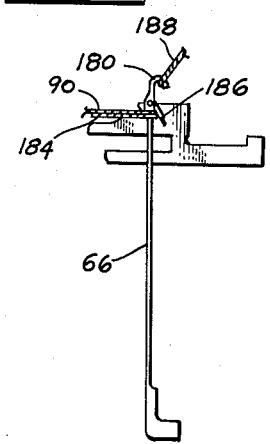
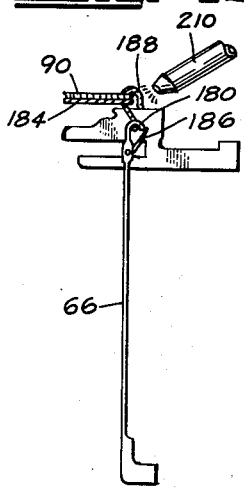
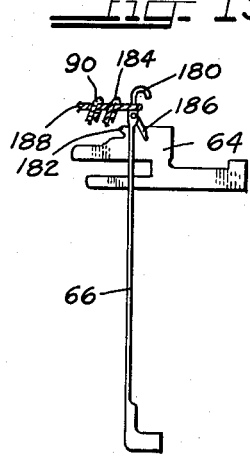
INVENTOR.
Oscar G. Walrabenstein Dec. 24, 1963   O. G. WALRABENSTEIN   3,115,024
APPARATUS AND METHODS FOR MAKING STOCKINGS AND THE LIKE
Filed Sept. 16, 1958   7 Sheets-Sheet 7

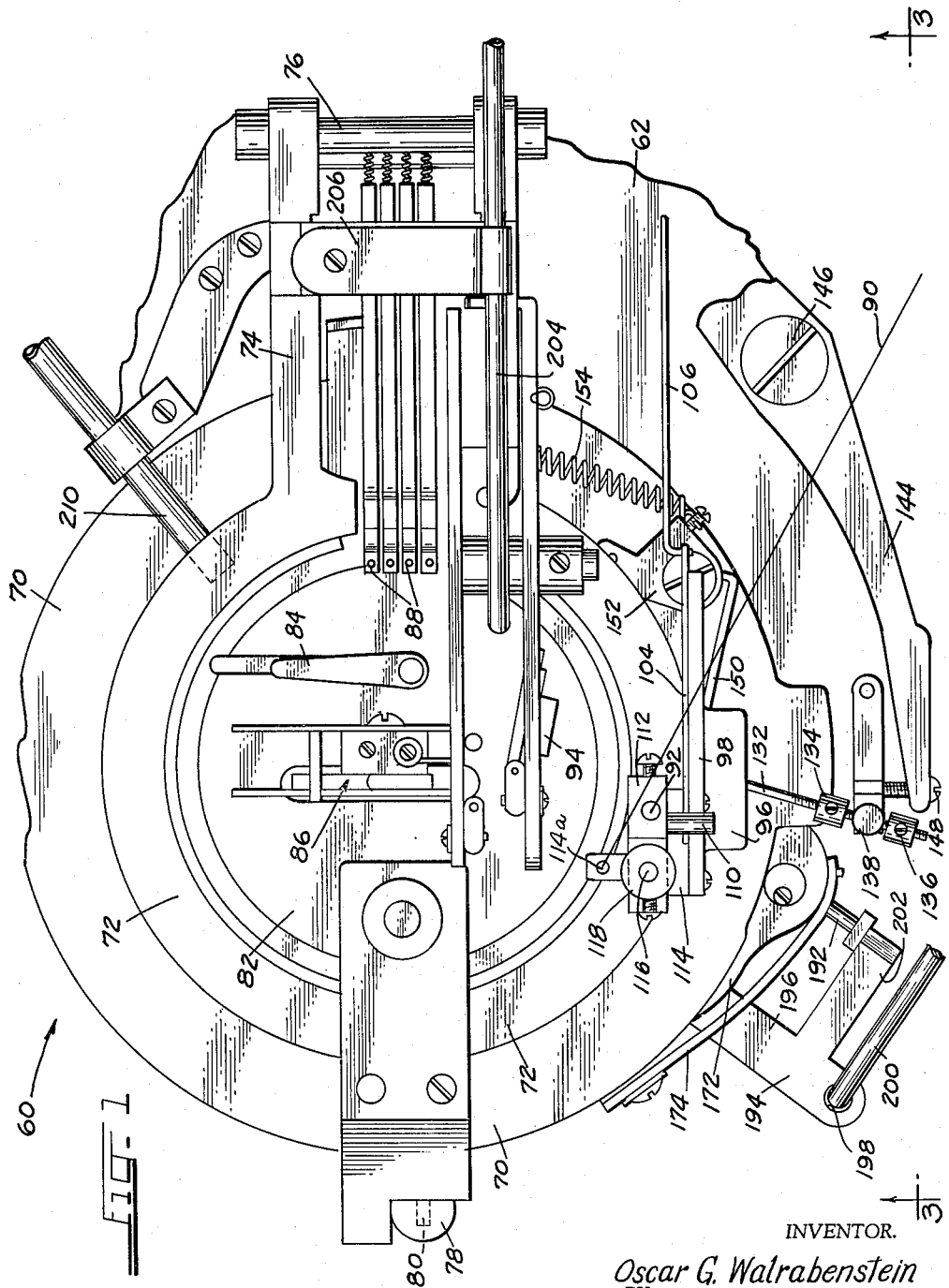

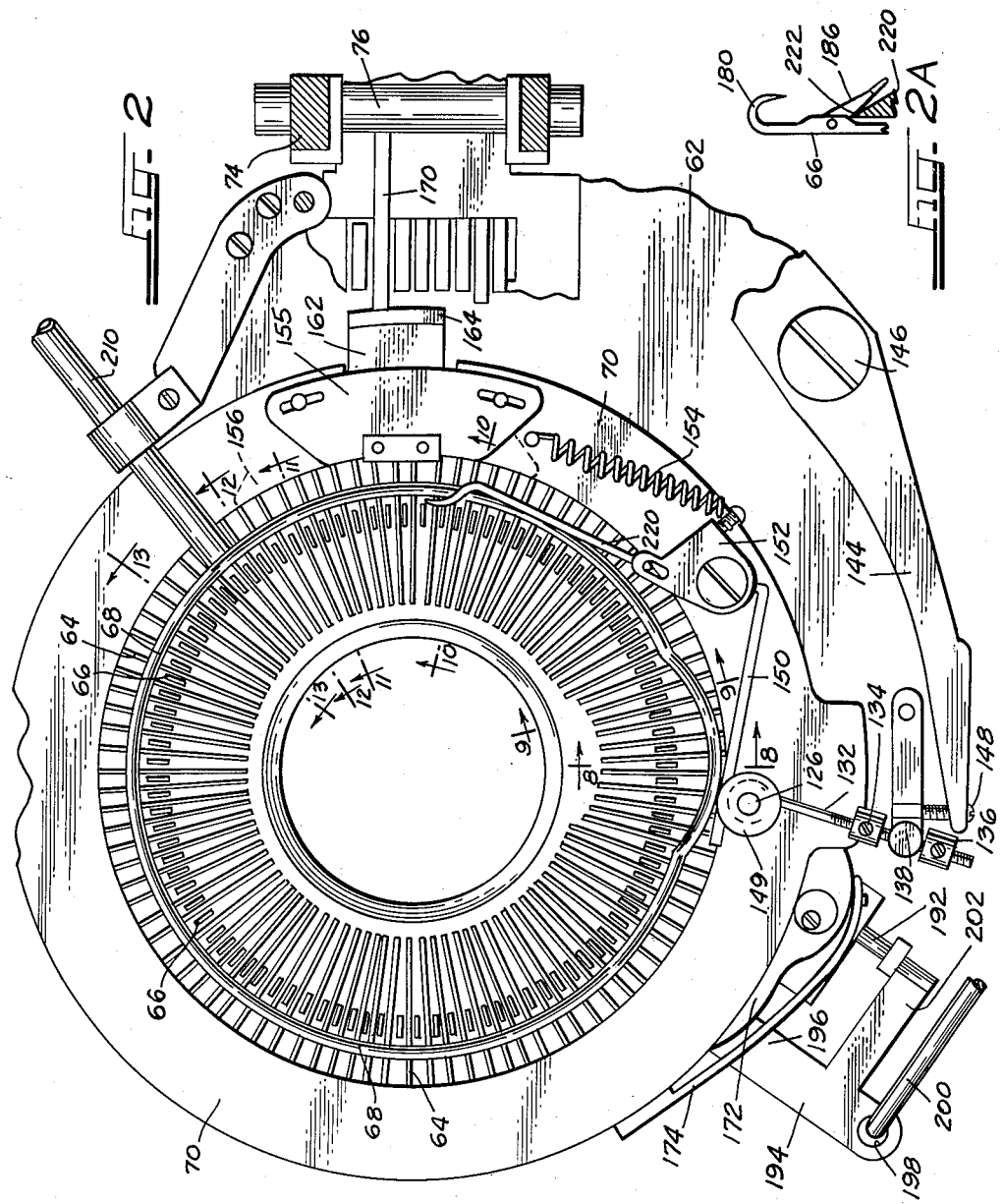

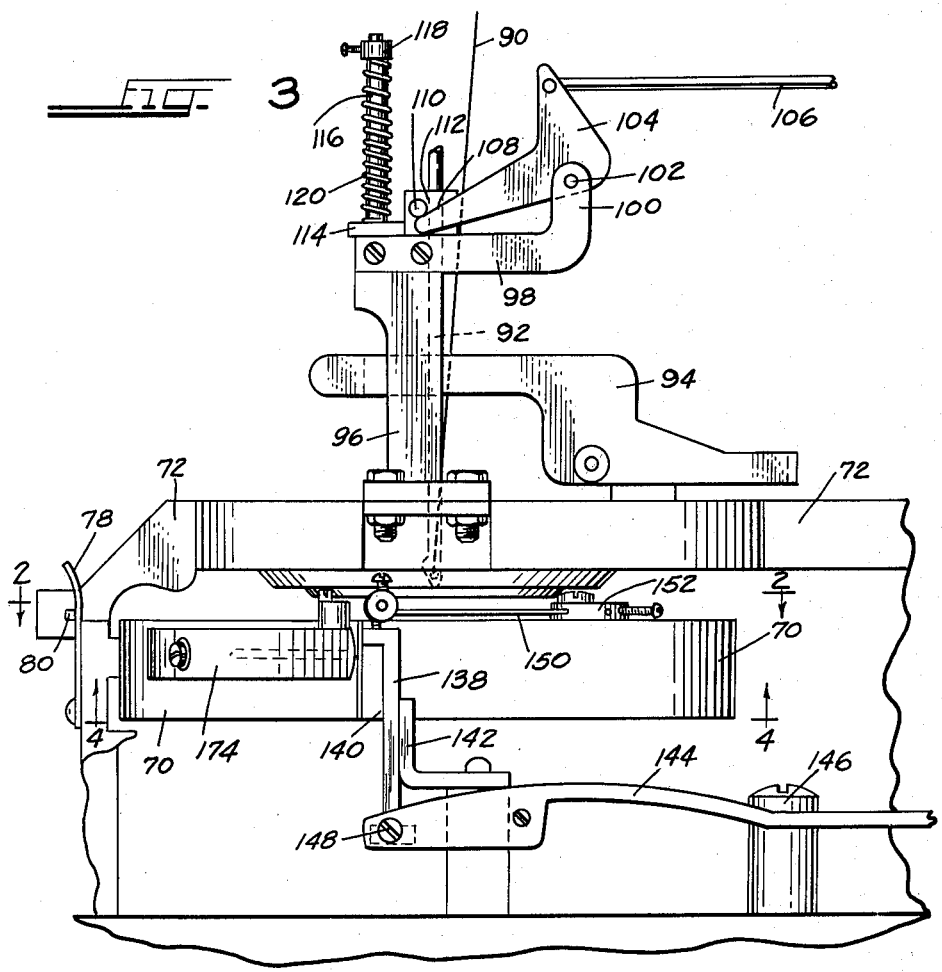

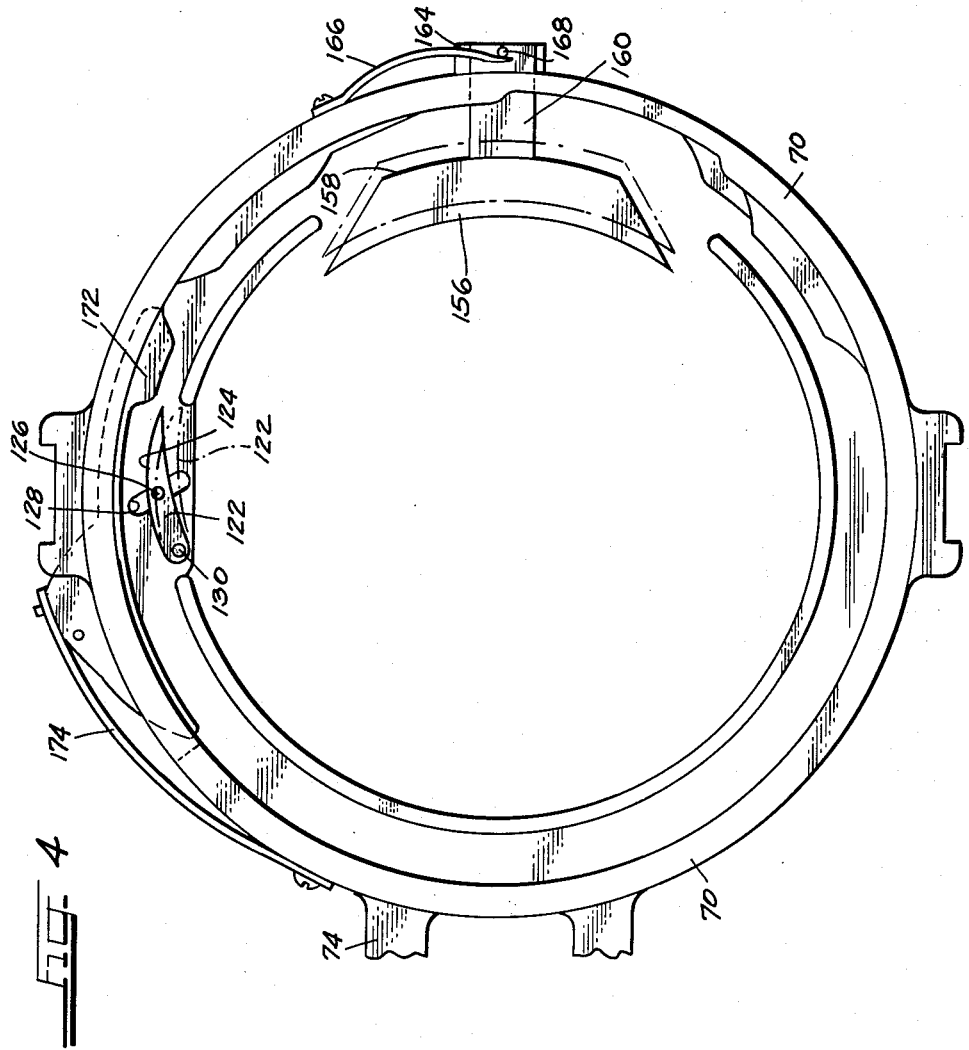

INVENTOR.
Oscar G. Walrabenstein
BY
Prangley, Baird, Clayton, Miller & Vogel
ATT'YS.

3,115,024
APPARATUS AND METHODS FOR MAKING
STOCKINGS AND THE LIKE
Oscar G. Walrabenstein, Kankakee, Ill., assignor to Bear Brand Hosiery Co., Chicago, Ill., a corporation of Illinois
Filed Sept. 16, 1958, Ser. No. 761,413
15 Claims. (Cl. 66—108)

The present invention relates to a new and improved elastic top stocking of the type having a garter band portion knitted of long, loose loops or stitches, and to improved circular knitting machine and knitting method for forming such stockings.

During recent years it has become popular, particularly among young people, to wear elastic top stockings of a kind having relatively bulky, loose knit tops, cuffs, or garter band portions. These stockings, in general, have been characterized in that the main portions of each stocking—that is, its leg and foot portions—have been formed in the normal manner with knitted loops of normal length using relatively inelastic yarn, while the top or garter band portion of each stocking has been formed of a plurality of courses in which the knitted loops of the relatively inelastic yarn are much longer than those in the leg and foot portions. Elastic yarn, such as rubber, has been laid in each of the loose courses of the top or garter band portions of these stockings, with the result that the main part of the stocking has been of normal texture while the top or garter band portion has been of a relatively loose, bulky, elastic nature.

Prior stockings of the kind just referred to have been manufactured on circular knitting machines, and the relatively long length of the loops of the top, cuff or garter band portion of each stocking, as compared to the normal length of the loops in the remaining parts of the stocking, has been achieved by a particular utilization of the sinkers in the knitting machine during the knitting operation. More specifically, in the formation of the top portion of the stocking the loops have been knitted over the tops of the nibs of the sinkers, whereas in the formation of the remaining parts of the stocking the loops have been knitted in the usual fashion with the yarn laid beneath the nibs of the sinkers, thus producing the relative difference in the lengths of the loops or stitches.

Despite the popularity of the type of stockings just described, their manufacture has heretofore involved some serious disadvantages. One of these disadvantages has been that, in order to knit the loose or long-loop tops of the stockings, it has been necessary to lay elastic yarn, such as rubber, into every course of the top. Thus, the cost of the elastic yarn needed in stockings of this type has been relatively high, and because of the presence of the elastic yarn in every course of the top or cuff portion of the stocking, their tops in many cases have not been as soft and loose as would be desirable. This prior need for elastic yarn in each course of the tops of the earlier stockings has been due to the relatively long length of the loops in the tops and due to the fact that the loops are formed across the tops of the sinkers. Because of these conditions, and in contrast to the normal knitting operation where the nibs of the sinkers exert a positive pressure on the stitches, there has been no sinker pressure on the stitches at the knitting point or at the point where the stitches are to be shed from the needle latches. In order to provide the necessary pressure at there two points it has heretofore been necessary to use elastic yarn in each and every one of the courses of the loose top or cuff, the elastic yarn yarn serving to control the movement of the main, relatively inelastic yarn in a manner analogous to that provided by sinker pressure in normal knitting operations.

Because of the expense involved in using elastic yarn in each course of the garter top or cuff of stockings of this type, and because such use of elastic yarn often causes the top or cuff to fit too snugly, it has been recognized that it would be desirable to employ elastic yarn in the loose knit, long-loop tops only in every other course, or in every third course, etc. However, the knitting machines and methods heretofore available have not been able to knit such tops with the long loop stitches in the absence of sinker pressure or in the absence of elastic yarn in every course.

Accordingly, it is an important object of the present invention to provide a new and improved stocking having a loosely knit top or cuff formed of long loop stitches, and wherein elastic yarn is present only in predetermined courses of the top or cuff and not necessarily in every course thereof. Another object of the invention is to provide a highly improved knitting machine and method for knitting the improved stocking of the present invention.

Yet another object of the invention is to provide, in a circular knitting machine for knitting loose, long loop stitches across the tops of the nibs of its sinkers, novel means for pushing the yarn downwardly over the latches of the needles and for shedding the yarn therefrom so that the yarn may thereafter close the latches. Still another object of the invention is to provide in a knitting machine of the type set forth, novel means for positively lifting the needle latches and positively moving said latches partially toward their closed position before the needles receive new yarn at the throat plate of the machine. Yet another important object of the invention is to provide in said knitting machine, novel means for moving the completed stitches inwardly off of the sinkers after the needles have received new yarn at the throat plate so as to insure that the needles will properly be raised outside of the formed stitches.

Still another object of the present invention is to provide, in a circular knitting machine for knitting loose, long loop stitches across the tops of its sinkers and for thereafter knitting on the same piece of fabric shorter stitches laid beneath the nibs of said sinkers, means for moving the sinkers radially outwardly, when in the area of the throat plate of the machine, only when said shorter stitches are being formed. Still another object of the invention is to provide an improved knitting machine which, during the knitting of a garter top, can knit with the sinkers in the inward position at the throat plate after acceptance of elastic yarn and until the sinkers are moved outwardly again to receive further elastic yarn, non-elastic yarn being fed over the tops of the nibs of the sinkers to make a loose stitch for the garter top.

These and other objects and advantages of the invention will be better understood from the following description when taken in conjunction with the accompanying drawings. In the drawings, wherein like reference numerals have been utilized to designate like parts throughout:

FIGURE 1 is a fragmentary plan view of the top of the improved circular knitting machine made in accordance with and embodying the principles of the present invention;

FIGURE 2 is a view similar to FIGURE 1 but with the latch ring of the machine broken away and removed to show the needles and sinkers;

FIGURE 2A is an enlarged fragmentary view of the upper end of a knitting needle, illustrating the relationship of a latch lifter cam thereto;

FIGURE 3 is a fragmentary side elevational view of the upper portion of the machine, substantially as seen in the direction of the arrows along the line 3—3 of FIGURE 1;

FIGURE 4 is a fragmentary view showing the under side of the sinker ring and the throat cam thereof;

FIGURE 5 is an enlarged diagrammatic view of a portion of a garter top, by way of example, made in accordance with the present invention, showing elastic yarn laid in every other course and behind every fourth wale to provide a ribbed configuration for the garter top;

FIGURE 6 is a view similar to FIGURE 5, but showing the elastic yarn disposed in every other course and disposed behind every other wale;

FIGURE 7 is an exploded diagrammatic view of the needles and sinkers, illustrating the elevations of the needles at the various positions about the needle cylinder;

Figure 8A:
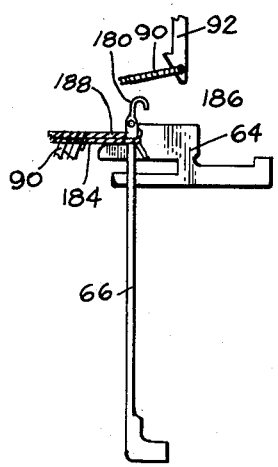

FIGURES 8 to 13, inclusive, diagrammatically illustrate the knitting of a course of the garter top in which rubber is laid; and FIGURES 8A to 13A, inclusive, diagrammatically illustrate the knitting of a course of the garter top in which no elastic yarn is employed.

Referring now to FIGURE 5 of the drawings, there is shown a section of the garter top of a stocking made in accordance with and embodying the principles of the present invention, the garter top section being generally designated by the numeral 20. The needle wales have been designated by the numerals 21n through 29n, the sinker wales have been designated by the numerals 21s through 29s, and the courses have been designated by the numerals 30 to 36. The courses 30 to 36 are illustrated as being knit in the usual way when forming an elastic garter top; more specifically, the courses are knit with the wales thereof substantially longer than the wales in a conventional stocking top or the foot of a stocking. The wales in the garter top 20 may be as much as twice as long as the usual wale or even longer. In addition to the stitches formed of relatively non-elastic yarn, certain of the courses have disposed therein an elastic or rubber yarn, these elastic yans being designated by the numerals 37, 38 and 39. The elastic yarn 37 has sections 37a disposed behind groups of three stitches such as the stitches formed by the needle wales 21n to 23n, sections 37b which extend in front of certain sinker wales such as the sinker wales 23s and 27s, sections 37c disposed behind single stitches such as the stitches formed by the needle wales 24n and 28n, and sections 37d which extend in front of certain other sinker wales such as the sinker wales 24s and 28s. The other elastic yarns 38 and 39 have corresponding sections which are correspondingly numbered in FIG. 5. It will be seen that the elastic yarns are disposed in every other course or in alternate courses of the garter top 20. The knitting of this particular garter top is accomplished with three adjacent knitting needles raised and the fourth knitting needle lowered, in a series of four knitting needles, whereby to dispose the elastic yarn on the outside of the raised needles in position to be engaged by the needle hooks and subsequently to pass the elastic yarn onto the inside of the lowered needles when the lowered needles are subsequently raised. This causes the elastic yarn to be disposed below the latches of the needles that engaged the elastic yarn in their hooks as they approach the knitting wave so that when knitting operation takes place, that portion of the elastic yarn which was engaged by the hooks of the three needles will be moved over and to a position behind those three needles and will be floated on the inside of the fabric. The portion of the elastic yarn which is deposited behind the fourth needle will not be knitted but will be bound by the junction of the loop formed by the fourth needle. The natural contraction of the elastic yarn grips the wales as indicated in FIGURE 5 of the drawings to provide a ribbed effect with respect to those wales disposed in front of or on the outside of the elastic yarn.

The garter top of FIGURE 5, it will be noted, uses substantially less elastic yarn than the previously known garter tops of long loop structure, which require or utilize an elastic yarn in each course. The garter top of FIGURE 5 is generally more economical to manufacture, yet is more comfortable for the wearer since a better control of the elasticity of the top can be achieved by depositing the elastic yarn only in the desired courses.

There is shown in FIGURE 6 of the drawings, by way of example, a second preferred form of garter top, generally designated by the numeral 40, which can be knitted by the machine and method of the present invention. The wales in the stocking top 40 are designated by the numerals 41 through 44 and the courses are designated by the numerals 45 through 50. Elastic yarn strands 51 through 53 are shown disposed in the fabric, the elastic yarn being placed in alternate courses and lying on the inside and outside of alternate stitches. The garter top fabric of FIGURE 6 also makes an economical use of the elastic yarn in that elastic yarn is placed only in those courses where it is needed and desired. The completed garter top is therefore economical as well as being comfortable to the wearer.

It is to be understood that other forms of garter top fabrics can be provided in accordance with the present invention. For example, instead of placing the elastic yarn in every other course of the fabric, it may be placed in two adjacent courses, with the courses on either side thereof having no elastic yarn disposed therein. In like manner, the elastic yarn may be placed only in every third or fourth course, if desired. Similarly, the elastic yarn may be laid in different patterns within each course. For example, the yarn may be laid behind two stitches and in front of the third or may be in front of two stitches and behind the next two and then in front of the next two, etc.

Referring now to FIGURES 1 to 4 of the drawings, there is shown an improved circular knitting machine, generally designated by the numeral 60, which is useful in knitting the improved stocking, including the garter tops of FIGURES 5 and 6 of the drawings, and in carrying out the method of the present invention. The machine 60 includes a bed plate 62 having a circular aperture therein in which the usual needle cylinder is rotatably mounted. The needle cylinder has mounted therein a plurality of needles 66 (see FIGURE 2) which are mounted in a conventional manner in vertical grooves in the cylinder for reciprocation by the usual drive mechanism (not shown). The needle cylinder also has on its upper end sinker receiving openings adapted to receive a plurality of sinkers 64 which are held by an endless coil spring 68, the coil spring continually urging the sinkers radially inwardly toward the center of the needle cylinder.

Referring also to FIGURE 1 of the drawings, it will be seen that the usual sinker ring 70 has been provided, within which is disposed the usual latch ring 72. The latch ring 72 has rearwardly extending arms 74 which are pivoted upon a support 76 so that the ring may be raised in a conventional manner. A latch 78, mounted on the bed plate 62, engages a keeper 80 on the latch ring 72 to hold it in the down or operating position.

The latch ring 72 carries a plate 82 upon which are mounted the usual main feed yarn clamp 84 (FIG. 1) and the main yarn cutter 86. These members receive the main or relatively inelastic yarn from yarn fingers 88 which are in turn supplied with yarn from sources not shown.

A strand 90 (FIG. 1) of elastic yarn is fed, from a source not shown, to an elastic yarn finger 92 which in turn feeds the yarn to an elastic yarn shearer and holder 94 mounted on the plate 82. The details of construction of the elastic yarn feed finger may be best seen from FIGURES 1 and 3 of the drawings where it will be observed that an upstanding support 96 is mounted on the latch ring 72 and carries on its upper end an L-shaped bracket 98 having an upstanding arm 100 (FIG. 3). Pivoted on the upper end of the arm 100 about a shaft 102 is a bell crank 104. One arm of the bell crank 104 is pivotally connected to a control link 106 which is connected to a control mechanism (not shown) of a conventional type commonly known and used in circular knitting machines. The other arm of the bell crank 104 is provided with a cam surface 108 which engages a pin 110 mounted on a collar 112 which is fastened to the upper end of the elastic yarn feed finger 92. From the above description it will be seen that movement of the control link 106 to the right, as viewed in FIGURE 3, will serve to lift the feed finger 92 upwardly.

Means are provided to keep the pin 110 in contact with the cam surface 108. More specifically, the collar 112 carries a laterally extending arm 114 which has a first opening 114a to receive the elastic yarn 90 therethrough and a second opening to receive therethrough an upstanding post 116 also mounted on the support 96. The upper end of the post 116 has a collar 118 fixedly mounted thereon, and a compression spring 120 is disposed between the arm 114 and the collar 118 and normally urges the arm 114 downwardly. Accordingly, any upward movement of the finger 92 serves to press the compression spring 120 which in turn holds the pin 110 in engagement with the cam surface 108 of the bell crank 104. By this described construction, the elastic yarn feed finger 92 can be selectively raised so as to remove the elastic yarn 90 from the area of operation of the knitting needles, such as when knitting the body and the foot of a stocking, and thereafter can be utilized to lower the finger 92 so as to place the elastic yarn 90 in position again to be engaged by the knitting needles so that the elastic garter top of the stocking can be knit.

When knitting the garter top portion of a stocking, it is desired that the radial disposition of the sinkers 66 at the various points about the knitting circle be that illustrated in FIGURE 2 of the drawings. It will be seen that the greater portion of the sinkers 66 are disposed radially inwardly toward the center of the machine. Only a few of the sinkers (disposed toward the bottom of FIGURE 2) are retracted outwardly. These sinkers are in the area in which elastic yarn is picked up by the knitting needles from the finger 92. When later knitting portions of the stocking other than the elastic garter top, it is desirable, on the other hand, that the sinkers in the area to the bottom of FIGURE 2 be positioned inwardly toward the center of the machine. Accordingly, cam mechanism is provided to move these sinkers outwardly when receiving elastic yarn from the finger 92.

The sinker retracting cam just referred to is best shown in FIGURE 4 of the drawings, where it is designated generally by the numeral 122. The cam 122 has a cam surface 124 thereon which is adapted to engage a cam surface on the sinkers to move the sinkers radially outwardly, to the position illustrated at the bottom of FIGURE 2, while receiving elastic yarn from the finger 92. The cam surface 124 moves the sinkers outwardly against the action of the coil spring 68, the sinkers being slidably supported in the usual manner on the appropriate inner and outer sinker rings carried on the top of the needle cylinder. Since the cam 122 must be positioned inwardly to the position designated by broken lines in FIGURE 4 when knitting the leg and foot of a stocking or other non-elastic portions thereof, control mechanism is provided selectively to position the sinker cam 122. To this end the cam 122 is provided with a rod 126 which passes upwardly through a slot 128 whereby to pivot the cam 122 about a pivot pin 130. The rod 126 connects with a rod 132 (see FIGURES 1, 2 and 3) provided with a pair of abutment members 134 and 136. The upper end of a lever 138 engages between the abutment members 134 and 136 to effect movement thereof toward and away from the needle cylinder. More specifically, the lever 138 is pivoted as at 140 on a bracket 142 which is fixedly attached to the machine.

The desired movement of the lever 138 is achieved by means of a control arm 144 which is pivoted to the machine at 146. The outer end of the control arm 144 carries an adjustable abutment screw 148 which is adapted to contact the lower end of the lever 138. Movement of the screw 148 inwardly toward the needle cylinder serves to urge the upper end of the lever 138 outwardly from the needle cylinder. Such motion of the upper end of the lever 138 also carries the rod 132 outwardly and serves to move the sinker control cam 122 from the position illustrated by broken lines in FIGURE 4 to that illustrated by the solid lines therein. The necessary movement of the control arm 144 is derived from the main control mechanism of the machine which is not illustrated but which is conventional.

The spring 68 serves to maintain the lever 138 in contact with the adjustment screw 148. Movement of the rods 126 and 132 also controls the position of a latch lifter cam to be described more fully later. To this end the rod 132 has a spool 149 fixed thereon and the periphery of the spool slidably contacts another rod 150. The rod 150 is fixed to a bracket 152 which is pivoted on the sinker ring 70 and is urged toward a predetermined position by a spring 154 which is under tension. The spring 154 serves continually to urge the rod 150 toward the outer position as illustrated in FIGURE 2.

Radial movement of the sinkers is also desired adjacent the throat plate 155 where the conventional or non-elastic yarn is received from the fingers 88. When knitting the conventional or non-elastic portions of the stocking, such as the body and the foot, the sinkers are retracted or moved radially outwardly at the throat. When knitting the garter top according to the present invention, on the other hand, the sinkers are disposed inwardly at the throat plate. This movement of the sinkers in the area of the throat plate is controlled by a crescent-shaped cam 156 (see FIGURE 4). A part-circular cam surface 158 is provided on the outer side of the cam 156 to engage the sinkers. When the cam 156 is in the position illustrated by solid lines in FIGURE 4, the sinkers remain inwardly as illustrated in FIGURE 2 at the throat plate. Movement of the cam 156 outwardly to the position illustrated by broken lines, however, serves to retract the sinkers at the throat plate as is the case when knitting the non-elastic portions of the stocking.

Suitable control mechanism is provided to shift the cam 156 from one position to another. To this end the cam 156 is provided with an outwardly extending arm 160 which is carried in a guide 162 (see FIGURE 2 of the drawings) and is provided with an abutment collar 164. A leaf spring 166 is provided which engages a pin 168 on the arm 160 whereby continually to urge the cam 156 toward the outer or broken line position of FIGURE 4. When it is desired to knit the garter top, a push rod actuator 170 (FIG. 2) engages the outer end of the arm 160 (FIG. 4) to push it inwardly against the action of the spring 166 to the solid line position of FIGURE 4. There also is shown in FIGURE 4 of the drawings an elastic yarn sinker pressure cam 172 which is movable inwardly and outwardly toward and away from the needle cylinder and it is normally urged inwardly by a leaf spring 174 (see also FIGURE 3).

Referring now to FIGURES 2 and 7 of the drawings, the general knitting operation will be described. When starting a new stocking, the first course at the top of the stocking is formed and a plurality of layers of the elastic yarn is placed in the top course by laying the elastic yarn on the bare needles. For example, two or as many as six or more layers of elastic yarn may be placed in the top course. Thereafter a garter top such as that shown in FIGURE 5 of the drawings may be knit. During the placing of the several layers of elastic yarn in the top course, the feed finger 92 is maintained in the lowered or feeding position and every other needle at this position is raised whereby to catch and place elastic yarn in the top course. More specifically, every other needle in the neighborhood of the line 8—8 in FIGURE 7 is raised by the usual associated jack to receive elastic yarn from the feed finger 92. When it is desired in the next course not to place elastic yarn therein, the needles to the left of the feed finger 92 in FIGURE 7 are all lowered by the usual take-down cams sufficiently so that they will not obtain elastic yarn in the hooks thereof; more specifically, the tops of the needles fall along the line indicated by the dashed line 176.

After passing the elastic yarn feed finger 92, the needles approach the throat plate and the non-elastic yarn feed fingers 88. The hook of the needle then picks up a new non-elastic yarn from one of the fingers 88 and proceeds to knit a stitch in a manner which will be described more fully hereafter. As the needles again approach the elastic yarn feed finger 92, proceeding in the counterclockwise direction as viewed in FIGURE 2, certain of the needles are raised by their respective associated jacks a sufficient height such that they can receive elastic yarn from the feed finger 92. Thereafter the elastic yarn is laid into a course of non-elastic yarn stitches.

The manner of knitting an elastic yarn into any desired course of the garter top will now be described with particular reference to FIGURES 8 through 13 of the drawings in which are shown diagrammatically the positions of the sinkers, the knitting needles, the elastic yarn and the non-elastic yarn. The diagrammatic views of FIGURES 8 to 13 are taken at selective points around the needle cylinder, as designated by the corresponding numbered section lines on FIGURES 2 and 7 of the drawings.

Assuming that a course of long looped stitches has been knitted, such as the course 31 in FIGURE 5 of the drawings, the needles next approach the elastic yarn feed finger 92. It will be understood that the needles are moving from right to left as viewed in FIGURE 7 of the drawings and in a counterclockwise direction as viewed in FIGURE 2 of the drawings. Immediately after passing the feed finger 92, certain of the needles 66 are raised high enough to receive the elastic yarn 90 in the hooks 180 thereof. If desired, in each set of four needles, three of the needles in succession are raised to a height sufficient to receive the elastic yarn in their hooks 180 and the fourth needle is sufficiently low so that it cannot receive the elastic yarn 90 in its hook 180. At this point in the knitting operation, the sinkers 64 are withdrawn radially in the area of the elastic yarn feed finger 92 and the nib 182 of a fully retracted sinker is in substantial vertical alignment with the center of the hook 180 of the needle about to pick up elastic yarn. The wale 184 of non-elastic yarn from the preceding course is still about the needle 66 and is in the general vicinity of the latch 186 of the needle, the latch being in the substantially fully opened position.

Continued advancing movement of each needle 66 will result in a lowering of the needle to the position illustrated in FIGURE 9 of the drawings. This lowering of the needle 66 will perform two functions, namely, to bring the elastic yarn 90 beneath the nib of a sinker 64 and to slip the non-elastic yarn 184 upwardly across the latch 186. Continued movement of the needle cylinder will cause the needles to begin to rise until they reach the position of FIGURE 10. In this position the hook of the needle will be well above the sinker 64 and the sinker will have been moved inwardly to its full extent. The elastic yarn 90 is still retained in the nib of the sinker and the non-elastic yarn 184 is trapped below the elastic yarn and is held in position thereby.

The knitting needles next arrive adjacent to the non-elastic yarn feed fingers 88 where the hook 180 of each needle engages a new supply of non-elastic yarn to form a wale thereof designated by the numeral 188. While picking up the wale 188 the needle 66 has moved downwardly whereby the elastic yarn 90, which is tensioned inwardly toward the center of the knitting machine, engages beneath the latch 186 whereby to begin to urge the latch toward the closed position. Continued movement of the needle cylinder is accompanied by lowering of the needle 66 to the position illustrated in FIGURE 12. This causes the stitch, including the elastic yarn 90 and the non-elastic wale 184, to move upwardly over the closed latch and off of the needle to be pulled inwardly by the tension in the elastic yarn 90. Thereafter, the needle 66 begins to rise to the position ilustrated in FIGURE 13 wherein the latch 186 opens. Subsequently, the needle 66 further rises to the position illustrated at the extreme left hand and right hand ends of FIGURE 7, after which the needles progressively fall to a low position as indicated at the point 190 in FIGURE 7.

The above operation completes the knitting of a course carrying an elastic yarn therein. It is to be understood that those needles which do not take the elastic yarn 90 in their hooks 180 knit in the usual manner with the elastic yarn lying on the inside thereof, or to the left in FIGS. 8 to 13 under the associated nibs 182.

According to the present invention it may next be desirable to knit a course in which no elastic yarn is included. The knitting needles rise on the right hand of the finger 92, as viewed in FIGURE 7, in the same manner described above when incorporating elastic yarn in the course. However, when knitting a course without elastic yarn, cam mechanism is provided to lower the needles as they pass the feed finger 92 so that the needles pass along the line 176 in FIGURE 7 and do not take elastic yarn in the hooks 180 thereof. This lowering of the needles is accomplished by means of an ordinary take-down cam actuated by a rod 192 (see FIGURES 1 and 2 of the drawings). The rod 192 is in turn operated by a T-shaped lever 194. One arm or portion 196 of the lever 194 is pivoted to the frame and an aperture 198 is formed in the other end thereof. A control link 200 engages in the aperture 198 and has the other end thereof attached to the camming drive of the machine. A third arm or portion 202 is disposed at a right angle with respect to the arm 196 and slidingly engages the outer end of the arm 192 to control the movement thereof and the associated cam.

Accordingly, when knitting a course with no elastic yarn therein, the control arm 192 is moved inwardly whereby to cause the hooks of the needles to follow the path 176 in FIGURE 7. The subsequent stages of knitting the course without elastic yarn therein are diagrammatically illustrated in FIGURES 8A through 13A, these figures correspond to the FIGURES 8 through 13 above as positioned on the needle cylinder and with respect to the other portions of the machine. Referring first to FIGURE 8A, it will be seen that the prior stitch, including the wale 184 of non-elastic yarn, the wale 90 of elastic yarn and the new wale 188 of non-elastic yarn are in substantially the same positions as they are in FIGURE 13 described above. The hook 180 of the needle is lower than that illustrated in FIGURE 8 whereby no elastic yarn 90 is picked up by the hook 180 at this time.

Figure 9A:
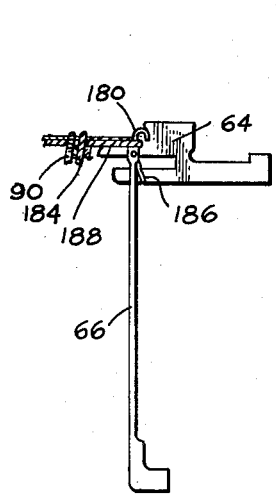
Figure 10A:
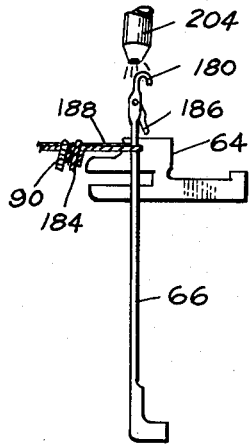
Figure 11A:
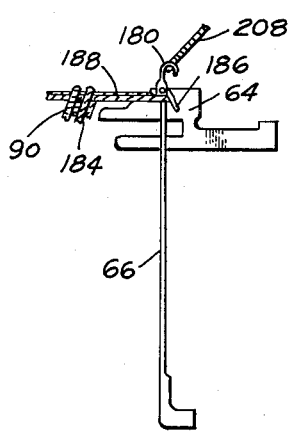
Figure 12A:
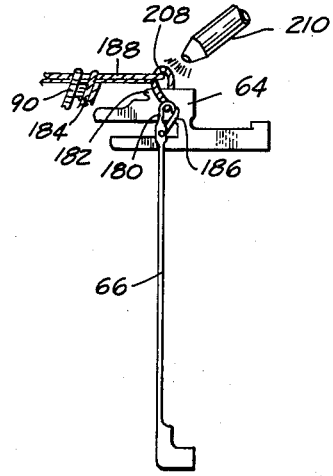
Figure 13A:
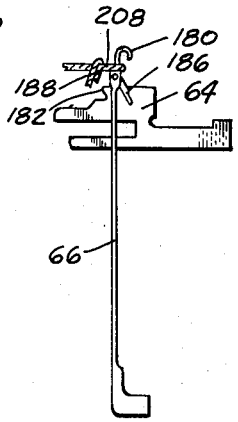

A representative needle 66 continues downwardly to the lowermost position in FIGURE 9A, but since there is no elastic yarn in the hook 180 there is no function performed by this movement of the needle 66. Thereafter the needle rises to the position in FIGURE 10A and the sinker moves inwardly to its innermost position. During this operation it is necessary that the wale 188 pass downwardly along the needle past the latch 186. There is substantially no knitting or sinker pressure at this point and, accordingly, there is no force tending to move the wale 188 downwardly. Since it is necessary that the wale 188 be beneath the latch 186 before subsequent knitting operations, means is provided to push the wale 188 down past the latch 186. To this end an air blast is provided directed generally downwardly, the air blast being provided from a tube 204. One end of the tube 204 is connected to a source of air under pressure (not shown) and the open end of the tube 204 is directed downwardly as illustrated in FIGURE 1 of the drawings. A mounting clamp 206 serves to mount the tube 204 on the latch ring 72. The air stream issuing from the tube 204 forces the loose wale 188 downwardly past the latch 186 as the needle 66 rises to the position illustrated in FIGURE 10A of the drawings.

The representative needle 66 then passes to a raised position before passing the non-elastic yarn feed fingers 88 and, upon passing the feed fingers 88, the hook 180 is moved downwardly to grasp another length of yarn 208, which is formed into a loose or long wale over the top of the adjacent sinker 64. The needle 66 moves downwardly and, as it does, the wale 188 moves upwardly to close the latch 186 and then to move above the upper end of the needle 66 as viewed in FIGURE 12A. At this point there is, again, no knitting or sinker pressure tending to push the newly formed stitch off of the sinker 64. Accordingly, it is necessary to provide means to insure that the stitch is shed off the sinker. To this end a second air blast is provided from a tube 210 (see FIGURES 1 and 2 also). One end of the tube 210 is connected to a source of air under pressure and the open end of the tube 210 is directed inwardly and slightly downwardly to cause the newly formed stitch to be shed off the sinker 64 inwardly toward the center of the needle cylinder. This completes the formation of the next course which does not contain any elastic yarn.

In making the garter top of FIG. 5, the actuating arm 200 is moved so that the needles between the line 8—8 and the line 9—9 in FIG. 7 will follow the upper or solid line path. Three needles in a row out of four will then grasp elastic yarn 90 from the feed finger 92 to deposit the elastic yarn in the next course. The course is then knitted in the way described above with respect to FIGS. 8 through 13 of the drawings. After knitting a course with the elastic yarn therein, another course may be knitted with no yarn therein in the manner described above with respect to FIGS. 8A through 13A. As many courses as desired may be knitted to produce the required length of the garter top, some of the courses having elastic yarn therein and some without, in any order desired.

After the top, cuff or garter band has been knitted in the manner described above, the rest of the leg or body of the stocking is knit with the usual short stitches. This is accomplished by changing the machine as follows. It is desirable to move the sinkers inwardly at the point adjacent to the elastic yarn feed finger 92. To this end the lever 144 is moved in a counterclockwise direction as viewed in FIG. 2 whereby to move the abutment screw 148 outwardly away from the needle cylinder. This will permit the spring 68 to move the sinkers inwardly and to pivot the member 152, whereby to cause the arm 150 to move the rod 126 inwardly so as to place the cam 122 in the dashed line position of FIG. 4. The actuator 170 (FIG. 2) is also moved outwardly whereby to place the cam 156 with the cam surface 158 thereof in the outer or dashed line position of FIG. 4. This will provide the usual throat or outer disposition of the sinkers adjacent to the point at which the non-elastic yarn is fed through the fingers 88. The elastic yarn feed finger 92 is raised upwardly by actuating the control link 106. This will serve to pivot the bell crank 104 in a clockwise direction as viewed in FIG. 3, which acting against the rod 110 will lift the feed finger 92 against the action of the spring 120. The machine is then in condition to knit the usual short loop stitches to provide the rest of the leg of the stocking. Thereafter the heel, foot and toe are knitted in the usual manner whereby to provide a complete stocking having the improved garter top of the present invention.

It has been found in certain cases that the latch 186 on the needles fails to move outwardly after passing the point indicated by the line 10—10 in FIG. 2. In order to insure that the latch 186 will always be in position to be closed, a latch lifter generally designated by the numeral 220 has been provided (see FIGS. 2 and 2A). One end of the latch lifter 220 is disposed in the bracket member 152. The other end of the latch lifter 220 is provided with a knife edge 222 which is adapted to be disposed against the shanks of the needles 66 at a point such that it can engage the outer ends of the latches 186 (see FIG. 2A particularly). The spring 154 serves to urge the knife edge 222 into engagement with the needles whereby to insure that the knife edge 222 will pass beneath the latches 186 to initiate closing movement thereof. When the member 126 is moved inwardly at the end of formation of a garter top, the rod 150 is urged in a clockwise direction as viewed in FIG. 2 whereby to pivot the bracket 152 in a clockwise direction and thus retract the cam lifter 220 from contact with the knitting needles 66.

The present knitting machine may be quickly changed to knit a garter top such as the garter top 40 illustrated in FIG. 6 of the drawings. The cam controlling the lifting of the needles in the area adjacent the elastic yarn feed finger 92 is changed so that alternate needles are raised and the intermediate needles are left in the lower portion. This will cause alternate needles to engage or receive the elastic yarn 90 so that it will have a stitch knit therearound as has been described above with respect to FIGS. 8 through 13 of the drawings.

The machine may also be controlled to knit various other arrangements of the elastic yarn in the garter top. For example, the elastic yarn may be incorporated in every third course instead of every other course. This is accomplished by actuating the control rod 192 to hold it in the inward position for two or more consecutive courses whereby to cause the needles during those courses to follow the path generally designated by the numeral 176 in FIG. 7 of the drawings. Alternatively, two adjacent courses may have the elastic yarn knit therein by having the needles assume the pattern illustrated by solid lines in FIG. 7 for two consecutive courses. Thereafter one, two, three or as many courses as desired, may be knit with no elastic yarn incorporated therein. Similarly, more than two adjacent courses may be knit with elastic yarn therein; for example three consecutive courses with elastic yarn may be knitted and these three courses separated by one, two or three or more courses with no elastic yarn therein before knitting a course having elastic yarn therein.

The knitting method of the present invention generally differs from the prior knitting methods in the provision of the air blasts from the tubes 204 and 210. As has been explained above, the air blast from the tube 204 is useful particularly when knitting long loop or loose stitches which are formed by placing the non-elastic yarn over the top of the nib of the sinkers. In this type of knitting operation, there will be no sinker pressure to pull the yarn beneath the latch of the needle as is customary when forming short loop stitches under the nibs of the sinkers. Neither will there be any pressure such as that ordinarily provided by the elastic yarn when knitting courses having elastic yarn laid therein. In short the knitting machines and methods used heretofore are not satisfactory to knit long loop stitches over the tops of the nibs of sinkers in the absence of an associated pressure applying elastic yarn. By supplying the air blast from the tube 204, knitting of this type of stitch over the top of the nibs of the sinkers can be readily accomplished in a rapid and economical manner with more smooth operation of the machine. This knitting operation is also more clean in that any lint or debris present in the knitting cylinder is blown therefrom by the air blast.

The air blast from the tube 210 performs an equally important function. When knitting the ordinary short loop stitches, there is substantial sinker pressure which aids in shedding the formed stitches from the sinkers. When the stitches are formed of long loops over the tops of the nibs of the sinkers as in the present invention, however, there is no such sinker pressure tending to shed the formed stitches from the sinkers. Prior devices and methods which have laid elastic yarn in the stitches have utilized the inward tension of the elastic yarn to cause the formed stitches to shed from the sinkers. In the present invention, however, when forming long loop stitches without with elastic yarn therein such as the courses 31, 33 and 35 of FIG. 5 and the courses 47 and 49 of FIG. 6, there is no tension supplied by elastic yarn to aid in shedding the formed stitches from the sinkers. According to the present invention, the air blast from the tube 210 provides the force to shed the formed stitches from the sinkers. This element therefore takes the place of the sinker pressure which is provided in machines when knitting normal short loop stitches. The air blast also takes the place of the inwardly directed tension provided by the elastic yarn when knitting courses having elastic yarn therein. None of the prior machines have accomplished the knitting of courses of long loop stitches having no elastic yarn therein, the long loops being formed on the tops of the nibs of the sinkers.

Accordingly, it will be seen that there has been provided improved garter top fabrics and stockings incorporating such fabrics therein, and an improved knitting method and machine for forming those improved fabrics. Although certain forms of the invention have been shown in the drawings and described for purposes of illustration, it will be understood that various modifications may be made therein, and it is intended to cover in the appended claims all such modifications as fall within the true spirit and scope of the invention.

I claim:

1. Apparatus for knitting a stocking comprising a circular knitting machine having sinkers having nibs and a plurality of needles arranged in a ring and means for raising and lowering said needles, means for feeding yarn to said needles, means for positioning said sinkers radially inwardly so that the yarn fed to said needles will be disposed on the top of the nibs of said sinkers while said needles are lowered in a knitting operation to thus produce elongated loops, and means positioned above said sinkers and said needles for applying positive force independent of the movement of said loops to push the elongated loops inwardly off of the tops of said sinkers and inwardly of said ring of needles whereby to shed the formed stitches from said sinkers and from said needles.

2. Apparatus for knitting a stocking comprising a circular knitting machine having radially movable sinkers and a plurality of needles arranged in a ring and means for raising and lowering said needles, means for feeding yarn to said needles, means for positioning said sinkers radially inwardly so that the yarn fed to said needles will be disposed across said sinkers while said needles are moved in a knitting operation to thus produce elongated loops, and means for applying positive force independent of the movement of said loops for pushing the elongated loops radially inwardly off of said sinkers and inwardly of said ring of needles whereby to shed the formed stitches from said sinkers and from said needles.

3. Apparatus for knitting a stock comprising a circular knitting machine having radially movable sinkers and a plurality of needles and means for raising and lowering said needles, means for feeding yarn to said needles, means for positioning said sinkers radially inwardly so that the yarn fed to said needles will be disposed across said sinkers while said needles are moved in a knitting operation to thus produce loops, and means for directing a fluid blast inwardly against said loops for pushing said loops radially inwardly off of said sinkers whereby to shed the formed stitches from said sinkers.

4. Apparatus for knitting a stocking comprising a circular knitting machine having sinkers having nibs and a plurality of needles and means for raising and lowering said needles, means for feeding yarn to said needles, means for positioning said sinkers radially inwardly so that the yarn fed to said needles will be disposed on the top of the nibs of said sinkers while said needles are lowered in a knitting operation to thus produce elongated loops, and means for producing an air blast and directing the same inwardly and downwardly to blow the elongated loops inwardly off of said sinkers whereby to shed the formed stitches from said sinkers.

5. Apparatus for knitting a stocking comprising a circular knitting machine having sinkers and a plurality of needles having latches and means for lowering said needles, means for feeding yarn to said needles, means for positioning said sinkers inwardly so that the yarn fed to said needles will be disposed across said sinkers while said needles are lowered in a knitting operation to produce elongated loops, means for thereafter raising said needles with respect to said sinkers with a loop positioned about each needle, and fluid means for pushing the loops downwardly past the latches of said needles.

6. Apparatus for knitting a stocking comprising a circular knitting machine having sinkers and a plurality of needles having latches and means for lowering said needles, means for feeding yarn to said needles, means for positioning said sinkers inwardly so that the yarn fed to said needles will be disposed across said sinkers while said needles are lowered in a knitting operation to produce elongated loops, means for thereafter raising said needles with respect to said sinkers with a loop positioned about each needle, and an air blast positioned above said needles and directed downwardly for blowing the loops below said latches of said needles.

7. Apparatus for knitting a stocking comprising a circular knitting machine having sinkers and a plurality of needles having latches and means for lowering said needles, means for feeding yarn to said needles, means for positioning said sinkers radially inwardly so that the yarn fed to said needles will be disposed across said sinkers while said needles are lowered in a knitting operation to produce elongated loops, first means for applying positive force independent of the movement of said loops to push the elongated loops radially inwardly off of said sinkers whereby to shed the formed stitches from said sinkers and to leave a loop around each of said needles, means for thereafter raising said needles with respect to said sinkers with each associated loop positioned about each associated needle, and second means independent of said first means for applying positive force independent of the movement of said loops to push the loops downwardly past the latches of the associated needles.

8. Apparatus for knitting a stocking comprising a circular knitting machine having sinkers and a plurality of needles having latches and means for lowering said needles, means for feeding yarn to said needles, means for positioning said sinkers radially inwardly so that the yarn fed to said needles will be disposed across said sinkers while said needles are lowered in a knitting operation to produce elongated loops, an air blast directed inwardly and downwardly against said needles and said sinkers to blow the loops from said sinkers, means for thereafter raising said needles with respect to said sinkers with a loop positioned about each needle, and a second air blast directed downwardly above said needles to blow the loops below said latches of said needles.

9. The method of knitting a stocking on a circular knitting machine having radially disposed sinkers with movable needles therebetween, comprising the steps of raising said needles and feeding relatively inelastic yarn thereto, lowering said needles with respect to said sinkers to place the yarn across the tops of said sinkers to form elongated loops thereacross, and thereafter blowing said elongated loops radially inwardly off of said sinkers to form a stitch.

10. The method of knitting a stocking on a circular knitting machine having radially disposed sinkers with movable needles therebetween, comprising the steps of raising said needles and feeding relatively inelastic yarn thereto, lowering said needles with respect to said sinkers to place the yarn across the tops of said sinkers to form elongated loops thereacross, and thereafter blowing said elongated loops radially inwardly off of said sinkers with a blast of air to form a stitch.

11. The method of knitting fabric in a knitting machine having sinkers and movable needles therebetween, comprising the steps of feeding yarn to said needles, moving said needles with respect to said sinkers to place the yarn across the sinkers to form loops thereacross, and thereafter blowing said loops off of said sinkers with a blast of air to form a stitch.

12. The method of knitting a stocking on a circular knitting machine having radially disposed sinkers with movable latch-type needles therebetween, comprising the steps of raising said needles and feeding yarn into the hooks of the needles, lowering said needles with respect to said sinkers to place the yarn across the tops of said sinkers to form loops thereacross, moving said loops radially inwardly off of said sinkers and inwardly with respect to said needles, raising said needles to clear said yarn from the hooks thereof, and directing a blast of air downwardly onto the raised needles to blow the yarn cleared from said hooks downwardly about the shanks of the needles and below the latches thereof preparatory to feeding fresh yarn to the hooks of said needles.

13. The method of knitting a stocking on a circular knitting machine having radially disposed sinkers with movable latch-type needles therebetween, comprising the steps of raising said needles and feeding yarn into the hooks of the needles, lowering said needles with respect to said sinkers to place the yarn across the tops of said sinkers to form loops thereacross, blowing said loops radially inwardly off of said sinkers and inwardly with respect to said needles with a blast of air, raising said needles to clear said yarn from the hooks thereof, and blowing the yarn cleared from said hooks downwardly about the shanks of the needles and below the latches thereof with another blast of air preparatory to feeding fresh yarn to the hooks of said needles.

14. The method of knitting fabric in a knitting machine having sinkers with movable latch-type needles therebetween, comprising the steps of feeding yarn into the hooks of the needles, moving said needles in one direction with respect to said sinkers to place the yarn across the sinkers to form loops thereacross, blowing said loops off of said sinkers with a blast of air, moving said needles in the opposite direction to clear said yarn from the hooks thereof, and blowing the yarn cleared from said hooks downwardly about the shanks of the needles and below the latches thereof with another air blast preparatory to feeding fresh yarn to the hooks of said needles.

15. A method of knitting a stocking on a circular independent needle knitting machine which comprises positioning the sinkers inwardly, raising the needles and feeding inelastic yarn thereto, lowering the needles to place the inelastic yarn on the top of the nibs of the sinkers to form long loops thereacross, and thereafter blowing the elongated loops inwardly off of the sinkers to form a stitch.

References Cited in the file of this patent

UNITED STATES PATENTS

| | | |
|---|---|---|
| 2,139,606 | Scholz | Dec. 6, 1938 |
| 2,275,276 | Williams | Mar. 3, 1942 |
| 2,420,771 | Crawford et al. | May 20, 1947 |
| 2,466,885 | Floyd | Apr. 12, 1949 |
| 2,473,677 | Crawford et al. | June 21, 1949 |
| 2,635,440 | St. Pierre | Apr. 21, 1953 |
| 2,658,366 | Shelmire | Nov. 10, 1953 |
| 2,716,876 | Surratt | Sept. 6, 1955 |
| 2,844,952 | Wawzonek | July 29, 1958 |